(12) United States Patent
Curran et al.

(10) Patent No.: US 7,358,291 B2
(45) Date of Patent: Apr. 15, 2008

(54) NANOCOMPOSITE FOR ENHANCED RECTIFICATION

(75) Inventors: Seamus A. Curran, Las Cruces, NM (US); Amanda V. Ellis, Auckland (NZ); Wudyalew T. Wondmaqegn, Bahir Dar (ET); James L. Dewald, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 0 days.

(21) Appl. No.: 11/166,606

(22) Filed: Jun. 23, 2005

(65) Prior Publication Data

US 2006/0293426 A1 Dec. 28, 2006

Related U.S. Application Data

(60) Provisional application No. 60/583,183, filed on Jun. 24, 2004.

(51) Int. Cl.
C08K 3/08 (2006.01)
(52) U.S. Cl. .................... 524/439; 524/403
(58) Field of Classification Search ........... 524/401, 524/403, 437, 439–441, 498
See application file for complete search history.

(56) References Cited

U.S. PATENT DOCUMENTS

| | | | |
|---|---|---|---|
| 5,247,190 A | 9/1993 | Friend et al. | |
| 5,399,502 A | 3/1995 | Friend et al. | |
| 6,103,868 A | 8/2000 | Heath et al. | |
| 6,562,403 B2 | 5/2003 | Klabunde et al. | |
| 6,576,341 B1 | 6/2003 | Davey et al. | |
| 6,610,367 B2 * | 8/2003 | Lewis et al. | 427/58 |
| 6,721,083 B2 | 4/2004 | Jacobson et al. | |
| 6,733,904 B2 | 5/2004 | Tao et al. | |
| 6,852,252 B2 | 2/2005 | Halas et al. | |
| 7,041,910 B2 * | 5/2006 | Swager et al. | 252/299.4 |
| 2003/0077515 A1 | 4/2003 | Chen et al. | |
| 2003/0096113 A1 | 5/2003 | Jacobson et al. | |
| 2004/0065970 A1 | 4/2004 | Blanchet-Fincher | |
| 2004/0150328 A1 * | 8/2004 | Czerw et al. | 313/506 |
| 2004/0150333 A1 | 8/2004 | Tsutsui | |
| 2004/0217696 A1 | 11/2004 | Kim et al. | |
| 2004/0241900 A1 | 12/2004 | Tsukomoto et al. | |
| 2005/0043503 A1 | 2/2005 | Stoddart et al. | |
| 2005/0069726 A1 * | 3/2005 | Douglas et al. | 428/690 |
| 2006/0158760 A1 * | 7/2006 | Portico Ambrosio et al. | 359/883 |

FOREIGN PATENT DOCUMENTS

| | | |
|---|---|---|
| WO | 2004/046031 A1 | 6/2004 |
| WO | 2004/053464 A1 | 6/2004 |
| WO | 2004/053546 A1 | 6/2004 |

OTHER PUBLICATIONS

Averine, S., et al., "Evaluation of Schottky Contact Parameters in Metal—Semiconductor—Metal Photodiode Structures", *Applied Physics Letters*, vol. 77, No. 2, (Jul. 10, 2000),274-278.
Bantikassegn, W., et al., "Electronic Properties of Junctions Between Aluminum and Doped Poly (3,4-ethylenedioxythiophene)", *Thin Solid Films* 293, (1997),138-143.
Bantikassegn, W., et al., "Electronic Properties of Junctions Between Aluminum and Neutral or Doped Poly[3-(4-octylphenyl)-2,2'-bithiophene", *Synthetic Metals*, vol. B7, (1997),5-10.
Bley, R. A., et al., "Thermoset and Thermoplastic Composites Using Polymer Wrapped SWNTs as Reinforcement", *Rev. Adv. Mater. Sci.* vol. 5, (2003),354-362.
Bridge, B., et al., "Investigation into the DC Conductivity of Colloidally Dispersed Gold/Polymer Composites", *J. Phys. D: Applied Phys.*, vol. 23, (1990),890-898.
Carroll, David L., "Advancing Organic Optoelectronics With Charge Transfer Nanocomposites", *SPIE Nanotechnology 2, E-Bulletin*, (Mar. 2004),1-2.
Coleman, J. N., et al., "Percolation-Dominated Conductivity in a Conjugated-Polymer-Carbon-Nanotube Composite", *Phys. Rev. B*, vol. 58, No. 12, (Sep. 15, 1998),7492-7495.
Corbierre, M. K., et al., *J. Am. Chem. Soc.*, vol. 123, No Copy Available, (2001),10411.
Curran, Seamus A., et al., "A Composite from Poly(m-phenylenevinylene-co-2,5-dioctoxy-p-phenylenevinylene) and Carbon Nanotubes: A Novel Material for Molecular Optoelectronics", *Adv. Mater.*, vol. 10, No. 14, (1998),1091-1093.
Curran, S., et al., "Photoconduction and Photovoltaic Effects from a Conjugated Polymer Poly-tert-butyl-isothionaphthalene", *Synthetic Metals*, vol. 83, (1996),239-243.

(Continued)

*Primary Examiner*—Peter Szekely
(74) *Attorney, Agent, or Firm*—Deborah A. Peacock; Vidal A. Oaxaca; Peacock Myers, P.C.

(57) ABSTRACT

Enhanced band bending materials for use in rectifying contacts comprising metal nanoparticles and a semiconducting polymer that is soluble in common organic solvents including, for example, a gold-polymeric nanocomposite comprising gold nanoparticles in poly(m-phenylenevinylene-co-2,5-dioctoxy-p-phenlenevinylene(("PmPV").
The nanocomposite material provides for enhanced Schottky barriers.

39 Claims, 7 Drawing Sheets

OTHER PUBLICATIONS

Doniach, S., et al., "Microscopic Metal Clusters and Schottky-Barrier Formation", *Phys. Rev. Letters*, vol. 58, No. 6, (Feb. 9, 1987),591-594.

Ettedgui, E., et al., "X-ray Photoemission Spectroscopy Study of Band Bending at the Interface of Metal with Poly(p-phenylene vinylene)", *Surface and Interface Analysis*, vol. 23, (1995),89-98.

Gonsalves, K. E., et al., "Surface-Functionalized Nanostructured Gold/Polymer Composite Films", *J. Materials Sci Letters*, vol. 15, (1996),948-951.

Gonsalves, K. E., et al., "Synthesis and Nonlinear Optical Characterization of Nanostructured Gold/Polymer Composites and Suspensions", *NanoStructured Materials*, vol. 7, No. 3, (1996), 293-303.

Guliants, Elena A., "A 0.5-um-thick polycrystalline Silicon Schottky Diode and Rectification Ratio of 10 to 6 power", *Applied Physics Letters*, vol. 80, No. 8, (Feb. 25, 2002),1474-1476.

Hussain, Irshad, et al., "Preparation of Acrylate-Stabilized Gold and Silver Hydrosols and Gold-Polymer Composite Films", *Langmuir*, vol. 19, (2003),4831-4835.

Lin-Vien, D., "Handbook of Infrared and Raman Characteristcic Frequencies of Organic Molecules", Textbook (*Academic Press, Inc.*, (1991),481.

Mallick, K., et al., "Synthesis of Highly Oriented Gold Thin Films by a UV-Irradiation Route", *Eur. Phys. J. Appl. Phys.*, vol. 29, (2005),45-49.

McCarthy, B., et al., "Complex Nano-Assemblies of Polymers and Carbon Nanotubes", *Nanotechnology*, vol. 12, (2001),187-190.

Raula, Janne, et al., "Synthesis of Gold Nanoparticles Grafted with a Thermoresponsive Polymer by Surface-Induced Reversible-Addition=Fragmentation Chain-Transfer Polymerization", *Langmuir*, vol. 19, (2003),3499-3504.

Rusa, Mariana, et al., "Controlled Fabrication of Gold/Polymer Nanocomposites with a Highly Structured Poly(N-acylethylenimine) Shell", *Macromolecules*, vol. 37, (2004),2766-2774.

Shan, Jun, et al., "Preparation of Poly(N-isoprophylacrylamide)-Monolayer-Protected Gold Clusters: Synthesis Methods, Core Size, and Thickness of Monolayer", *Macromolecules*, vol. 36, (2003),4526-4533.

Smit, G. D., et al., "Enhanced Tunneling Across Nanometer-Scale Metal-Semiconductor Interfaces", *Applied Physics Letters*, vol. 80, No. 14, (Apr. 8, 2002),2568-2570.

Sze, M., "Physics of Semiconductor Devices", Textbook (John Wiley & Sons, (1969),364-417.

Yakimov, A. I., et al., *J. Exp. Theor. Phys.* vol. 75 Copy Not Available, (2002),102.

Burroughes, J. H., et al., "Light-emitting diodes based on conjugated polymers", *Nature*, vol. 347,(Oct. 11, 1990),539-541.

Ellis, A. V., et al., "Hydrophobic Anchoring of Monolayer-Protected Gold Nanoclusters to Carbon Nanotubes", *Nano Letters*, vol. 3, No. 3, American Chemical Society,(2003),279-282.

Ellis, A. V., et al., "Phase Transitions in Octanethiol-Capped Ag. Au and CdS Nanocluster Assemblies", *Mat. Res. Soc. Symp. Proc.*, vol. 739, Materials Research Society,(2003),127-132.

Galletto, Paolo, et al., "Size dependence of the surface plasmon enhanced second harmonic response of gold colloids: towards a new calibration method", *Chem. Commun.*, (1999),581-582.

He, Jin-An, et al., "Electrostatic Multilayer Deposition of a Gold-Dendrimer Nanocomposite", *Chem. Mater.*, vol. 11, American Chemical Society,(1999),3268-3274.

Kraft, Arno, et al., "Elektrolumineszierende konjugierte Polymere—Polymere erstahlen in neuem Licht", *Angew. Chem.*, vol. 110, Wilcy-VCH Verlag GmbH, Weinheim,(1998),416-443.

Lordi, Vincenzo, et al., "Molecular mechanics of binding in carbon-nanotube-polymer composites", *J. Mater. Res.*, vol. 15, No. 12, Materials Research Society,(Dec. 2000),2770-2779.

Mulvaney, Paul, "Not All That's Gold Does Glitter", *MRS Bulletin*, (Dec. 2001),1009-2001.

Schaaff, T. H., et al., "Giant Gold-Glutathione Cluster Compounds: Intense Optical Activity in Metal-Based Transitions", *J. Phy. Chem B*, vol. 104, American Chemical Society,(2000),2630-2641.

Schroedter, Andrea, et al., "Ligand Design and Bioconjugation of Colloidal Gold Nanoparticles", *Angew. Chem. Int. Ed.*, vol. 41, No. 17, Wiley-VCH Verlag GmbH & Co., Weinheim,(2002),3218-3221.

Shiraishi, Yukihide, et al., "Oxidation of ethylene catalyzed by colloidal dispersions of poly(sodium acrylate)-protected silver nanoclusters", *Colloids and Surfaces*, vol. 169, Elsevier,(2000),59-66.

Whetten, Robert L., et al., "Nanocrystal Gold Molecules", *Advanced Materials*, vol. 8, No. 5, VCH Verlagsgesellschaft mbH, Weinheim,(1996),428-433.

Wilcoxon, J. P., et al., "Optical properties of gold and silver nanoclusters investigated by liquid chromatography", *Journal of Chemical Physics*, vol. 115, No. 2, American Institute of Physics,(Jul. 8, 2001),998-1008.

Wilcoxon, J. P., et al., "Optical properties of gold colloids formed in inverse micelles", *J. Chm. Phys.*, vol. 98, issue 12, American Institute of Physics,(Jun. 1993),9933-9950.

Woo, H. S., et al., "Hole blocking in carbon-nanotube polymer composite organic light-emitting diode based on poly (m-phenylene vinylene co-2-, 5-dioctoxy-p-phenylene vinylene)", *Applied Physics Letters*, vol. 77, No. 9, American Institute of Physics,(Aug. 25, 2000), 1393-1395.

Yang, Yiyun, et al., "Surface Manipulation of the Electronic Energy of Subnanometer-Sized Gold Clusters: An Electrochemical and Spectroscopic Investigation", *Nano Letters*, vol. 3, No. 1, American Chemical Society,(2003),75-79.

\* cited by examiner (a)

(b)

NANOCOMPOSITE FOR ENHANCED RECTIFICATION

CROSS-REFERENCE TO RELATED APPLICATION

This application claims priority to, and the benefit of the filing of, U.S. Provisional Patent Application Ser. No. 60/583,183, entitled "Fabrication of a Gold-Polymeric Nanocomposite", filed on Jun. 24, 2004, and the specification of that application is incorporated herein by reference.

BACKGROUND OF THE INVENTION

1. Field of the Invention (Technical Field)

The present invention relates to materials for enhanced band bending, particularly for use in rectifying contacts. These materials comprise metal nanoparticles and a semiconducting polymer.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Metal contact to semiconductor interfaces manifest basic features of many rectifiers and metal semiconductor (MS) devices which are critical elements in a number of important technologies, such as OLEDs, field effect transistors, and sensors. When a metal is making intimate contact with a semiconductor, the Fermi-levels in the two materials must be coincident at thermal equilibrium.

Depending on the difference in work functions of the metal and semiconductor, the contacts may be either ohmic or non-ohmic, the interface of the latter being a rectifying (Schottky) contact. An ohmic device is one that demonstrates Ohm's Law V/I=R where resistance R is a constant, V is voltage and I is the current. In semiconductor devices, highly doped regions are referred to as ohmic contacts and approximate ohmic responses even though moderately doped regions are strongly dependent on voltage.

A Schottky barrier is created by the intimate contact of a metal surface and a semiconductor surface, and depends on the metal's work function, the band gap of the semiconductor, and the type and concentration of dopants in the semiconductor. FIG. 1 shows a Schottky barrier of a metal and a p-type semiconductor. FIG. 1(a) shows the relationship before contact and FIG. 1(b) shows the resulting Schottky barrier after contact.

At equilibrium, in the absence of externally applied voltages, the Fermi level must be constant throughout the sample. Otherwise, a current would flow. In the metal, the Fermi level is the top of the electron sea, while in the semiconductor, far from the interface, the Fermi level is determined by the impurity level. Doping allows manipulation of the Fermi level. When junctions are formed between materials with different Fermi levels, band bending occurs in such a way that the Fermi levels equate across the junction.

The Fermi level is matched as follows. Before equilibrium, the Fermi level is lower in the semiconductor (when the work function of the polymer, $E_{vac}-E_F=\chi+V_n$, is larger than that of the metal, $\phi_m$). Therefore, electrons will flow from the metal to the semiconducting polymer. This causes the build-up of charges on both sides of the interface, resulting in an electric field and therefore a potential gradient according to Poisson's equation $d^2V/dx^2=\rho(x)$. This is the so-called band bending; different metals result in different levels of band bending in the semiconductor. In this region, the electric field has caused the holes to move away from the interface; they drift to the top of the valence band. The result is that in this area of width W there is a surplus of negative charge caused by uncompensated charged acceptors, and this region is said to be the depletion region because there is an absence of majority carriers (holes in p-type semiconductors).

The parameters that describe the Schottky barrier are the barrier height ($\phi_B$) the built-in voltage ($V_{bi}$) and the depletion width (W). The barrier as seen by (majority) carriers coming from the metal is the barrier height which depends on the difference in electron affinity of the metal and the semiconductor and which (for p-type semiconductors) also depends on the energy gap $E_g$. The barrier as seen by (majority) carriers going into the metal is the built-in voltage or zero-bias band bending. This is determined by the difference in Fermi level before contact. The depletion width is the width of the area devoid of (majority) carriers.

The transport of current in a metal semiconductor junction is primarily the result of majority carriers. The transport equation of an ideal metal semiconductor rectifying contact is given by the following Schottky barrier diode equation:

$$J=J_o[\exp(qV/n\ kT)-1]$$

where J is the total current density, $J_o$ is the value of the reverse saturation current density, q is the charge of an electron, V is the applied voltage, k is the Boltzmann constant, T is absolute temperature, and n is the diode quality (ideality) factor.

For inorganic semiconductor/metal contacts, an explicit relationship between the barrier height $\phi_b$ and $J_o$ can be obtained from thermionic emission/diffusion theory as:

$$J_o=A^{**}T^2[\exp(-q\phi_b/kT)]$$

where $A^{**}$ is the modified Richardson constant. For an electron in free space, $A=120\ A/cm^2K^2$. For high enough voltages (at room temperature), the Schottky barrier diode equation can be simplified by considering the exponential term in the brackets to be dominant. Then, the slope of the logarithmic plot is related to the quality factor n through:

$$\frac{1}{n}=\frac{kT}{q}\frac{\partial \ln J}{\partial V}$$

Technology is constantly pushing the limits of microelectronics, providing for increasingly smaller and faster circuits. Consequently, current fabrication methods and materials are nearly at their theoretical limits. Nanoscale materials composed of either metal or semiconductor particles are playing an increasingly important role as novel building blocks in physics, solid state chemistry, and materials science. Because of the high surface to volume ratio of nanoparticles, surface properties have significant effects on structural and optical properties. By controlling the size and surface of a nanocrystal, its properties can be tuned.

The literature of the prior art discloses the fabrication of nanocomposites comprising polymers. For example, Curran et al., Adv. Mater. 1998, 10, No. 14, disclose "doping" poly(m-phenylenevinylene-co-2,5-dioctoxy-p-phenylenevinylene) (PmPV) with multiwalled nanotubes to increase electrical conductivity of the polymer. U.S. Pat. No. 6,576,341 discloses using a polymer (PmPv) to purify nanotube "soot" by extracting nanotubes from their accompanying material. U.S. Pat. Application Publication No. 2005/0043503 discloses a polymer-nanotube composite comprising PmPV to enhance such properties as the solubility of solvents. U.S. Patent Application Publication No. 2004/0241900 discloses an organic semiconductor material in which carbon nanotubes are dispersed in a conjugated polymer. Raula et al., *Langmuir* 2003, 19, 3499-3504, describe monolayer-protected clusters ("MPC's") of metal nanoparticles having specific electronic, optoelectronic, and catalytic properties. The MPC's comprise a metal core and a shell ranging from small organic compounds to macromolecules and includes gold nanoparticles covalently bound with poly(N-isopropylacrylamide) and with a mixture of poly(N-isopropylacrylamide) and polystyrene. Carroll, *SPIE Nanotechnology e-bulletin*, June 2004, 1-2, describes advancing organic optoelectronics with charge transfer nanocomposites comprising blends of conjugated polymers and dispersed single-walled carbon nanotubes (SWNTs). Ettedgui et al., *Surface and Interface Analysis*, Vol. 23, 89-98 (1995), describe band bending in PPV in contact with Al. Band bending occurs, leading to barrier formation which presumably impedes electron flow in polymer-based devices, during the deposition of Al on pristine PPV samples in accordance with the Schottky barrier formation. Bley et al., *Rev. Adv. Mater. Sci.* 5 (2003) 354-362, describe a method for incorporating SWNTs into PmPV.

At present, the quality and performance of devices made from metal semiconductor contacts is poor because interface states have detrimental effects, causing an unwanted change of band structure and thus blocking possible conduction paths.

BRIEF SUMMARY OF THE INVENTION

An embodiment of the present invention provides enhanced band bending materials for diodes fabricated from metal nanoparticles and a semiconducting conjugated polymer or monomer which is soluble in common organic solvents including, but not limited to, a gold-polymeric nanocomposite comprising poly(m-phenylenevinylene-co-2,5-dioctoxy-p-phenlenevinylene) ("PmPV"). Various other coiling monomers, polymers, oligomers and aggregates can be used such as poly(dioctyl fluorene) or poly(sulphonic acid), and polymers such as polyacetylene that can form strands and/or ropes. Ag, Pt, Pd, Al, and any other metal or material that enhances band bending can be used in the nanocomposite of the present invention.

In one embodiment, the present invention provides for a nanocomposite material comprising a non-linear chain, and nano-sized particles disposed in the chain, and enhanced band bending. The non-linear chain preferably comprises a coiling chain, more preferably a coiling polymer, a coiling oligomer, a coiling aggregate, or a coiling monomer. Preferably, the coiling polymer comprises poly(m-phenylenevinylene-co-2,5-dioctoxy-p-phenylenevinylene). In another embodiment, the non-linear chain comprises a biological system such as, but not limited to, DNA.

The nano-sized particles preferably comprise metal, more preferably gold. In other embodiments, the metal comprises at least one of gold, silver, platinum, palladium, aluminum, and/or a combination thereof. The nano-sized particles are preferably from between approximately 1 and 100 nm in size, more preferably from between approximately 5 and 50 nm in size.

In another embodiment, the present invention provides a method for constructing a nanocomposite material comprising providing a non-linear chain, disposing nano-sized particles in the non-linear chain, and providing for enhanced band bending. The non-linear chain preferably comprises a coiling chain such as a coiling polymer, a coiling oligomer a coiling aggregate, a coiling monomer, a biological system such as, but not limited to, DNA, and/or a combination thereof. The coiling polymer preferably comprises providing poly(m-phenylenevinylene-co-2,5-dioctoxy-p-phenylene).

The method further preferably comprises providing an interdigitation of the nano-sized particles through the non-linear chain. The method preferably further comprises uniformly dispersing the nano-sized particles in the non-linear chain. More preferably still, the method further comprises uniformly dispersing the particles in clusters.

In another embodiment, the method comprises providing a suspension comprising an organic material selectively coiled about metal nanoparticles.

In yet another embodiment, the present invention comprises a contact apparatus with enhanced electrical conductivity comprising a nanocomposite material comprising a non-linear chain, nano-sized particle disposed in the chain, a metal electrode, and enhanced band bending. In an embodiment, the metal electrode comprises a low workfunction metal such as, but not limited to, aluminum. In one embodiment, the contact apparatus comprises a Schottky diode.

A primary object of the present invention is to provide for enhanced band bending in materials used for rectifying contacts.

A primary advantage of the present invention is that the flexibility, ease of processing, light weight, low cost, and unique electrical and photonic properties of the nanocomposite material of the present invention make it ideal for making nanostructured materials for potential uses in antistatic coatings, electromagnetic shielding for electronic devices or other large area thin film electronic devices.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

An embodiment of the present invention provides a nanocomposite material for enhanced band bending particularly for use in rectifying contacts. The material comprises metal nanoparticles and a semiconducting polymer or monomer that is soluble in common organic solvents. Thus, the nanocomposite material of the present invention preferably comprises a non-linear, preferably coiling, polymer or monomer chain and an enhanced band bending material or nanoparticle such as a band bending metal.

By replacing purely inorganic diodes with a combination of organic/inorganic materials, a new interface dielectric constant is provided, and the band gap can be tuned thus constructing higher performance devices. The metal-polymeric materials or nanocomposites of the present invention are applicable for use in electronic devices such as diodes.

Figure 1:
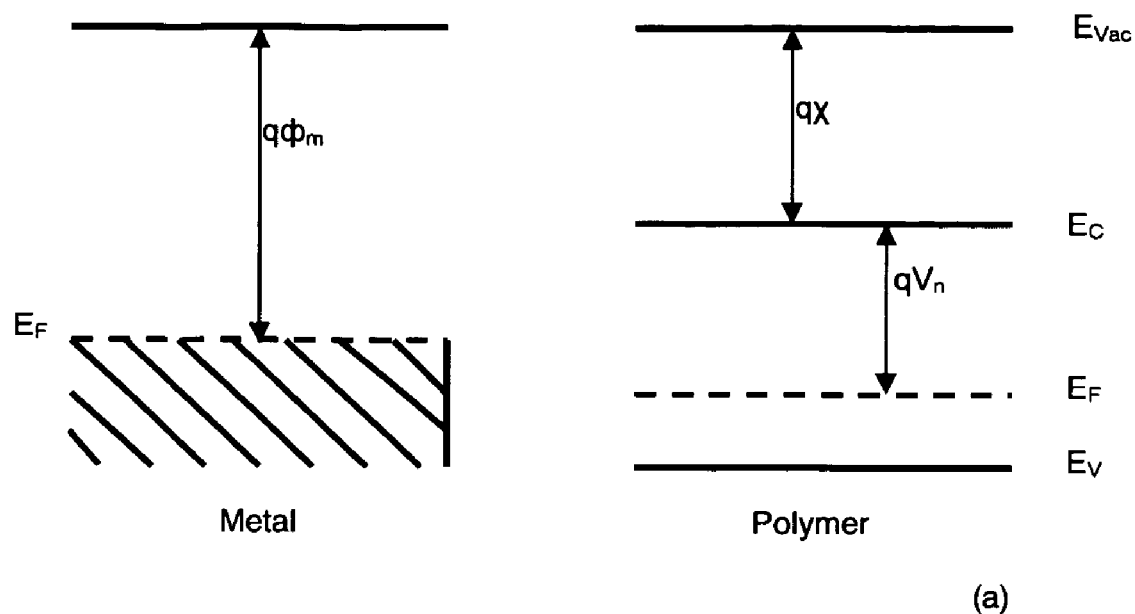
FIG. 1 is a diagram of a metal and a semiconductor (a) before contact and (b) after contact of the metal and the semiconductor thus forming a Schottky barrier.
Figure 1:
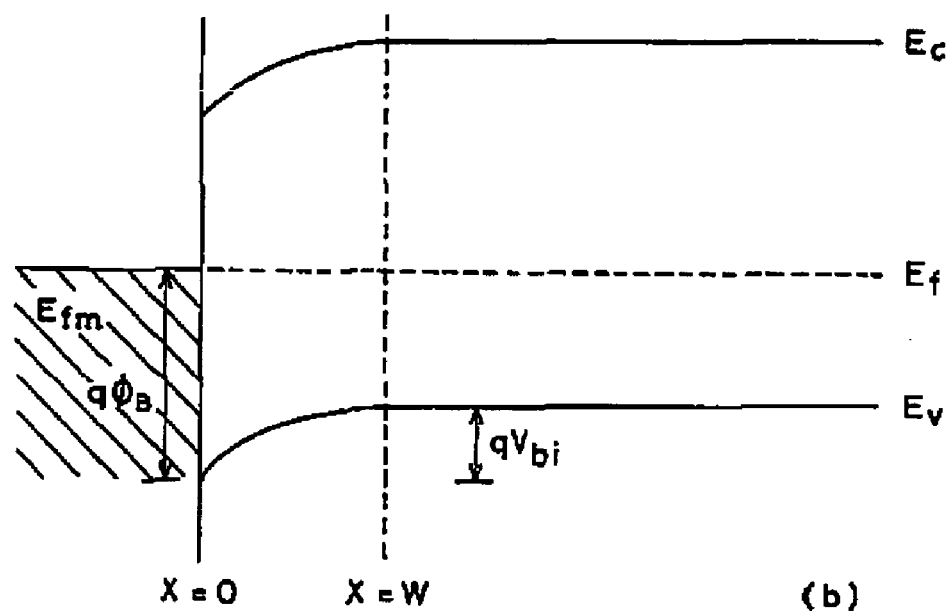
Figure 2:
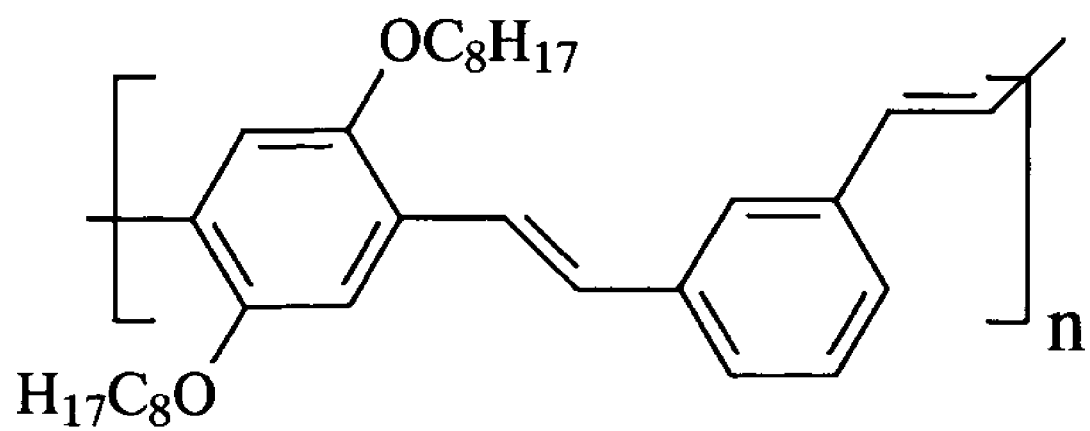
FIG. 2 is a diagram of a repeat monomer of poly(m-phenylenevinylene-co-2,5-dioctoxy-p-phenyleneyinylene) ("PmPV")

In one embodiment, the nanocomposite material includes, but is not limited to, a gold-polymeric nanocomposite comprising gold nanoparticles in poly(m-phenylenevinylene-co-2,5-dioctoxy-p-phenlenevinylene) ("PmPV"), a conjugated polymer thin film. FIG. 2 shows the conjugated polymer thin film PmPV.

In other embodiments of the present invention, other coiling polymers, oligomers, and aggregates can be used such as, but not limited to, poly(dioctyl fluorene) and poly(sulphonic acid). Other polymers that can form strands and/or ropes, such as polyacetylene, can also be utilized in the embodiments of the present invention. In addition, DNA and all related coiling biological systems can be used in the practice of the present invention. Preferably, the nanocomposite of the present invention comprises any metal or material or combination thereof, that enhances band bending including, but not limited to, silver (Ag), platinum (Pt), palladium (Pd), and/or aluminum (Al).

New metal/polymer nanocomposite materials are attractive for electronic devices because metallic nanoparticles possess large surface areas. Polymer semiconductor materials such as poly(m-phenylenevinylene-co-2,5-dioctoxy-p-phenlenevinylene) ("PmPV") provide flexibility, ease of processing, and low cost, and they are lightweight.

Although a variety of non-linear chains may be utilized in the present invention, this discussion focuses on PmPV as a representative example of the preferred characteristics and functions of the non-linear chain, and gold nanoparticles are discussed as representative examples of the nanoparticles embedded in the chain.

PmPV is a substituted form of poly(2-methoxy-5-(2-ethyl-hexyloxy)-1,4-phenylenevinylene) (PPV) and as such has an added dihedral angle that makes the chain tend to spiral into a helix. The helical nature of PmPV allows it to "coil" around the nanoparticles thereby maintaining a regular structure and crystallizing more easily. Thus, the PmPV is able to bind tightly and increase conductivities via a percolation process, which occurs as a result of increasing the number of interconnections and thus increasing the number of conducting paths to the polymer. The interconnections are the nanoparticles such as, for example, gold nanoparticles. The percolation process is indicative of the percolative character in composite systems, which depends on the number of the interconnections present. The flexibility, ease of processing, lightweight, low cost, and unique electrical and photonic properties make PmPV a preferred material for the making of nanostructured materials for use in, for example, antistatic coatings, electromagnetic shielding for electronic devices, or other large area thin film electronic devices. PmPV has certain desirable basic electronic properties such as conductivity ($\sim 2\times10^{-10}$ S/m) and bandgap ($\sim 3.1$ eV).

In one embodiment, the nanoparticles embedded in the PmPV, for example, comprise gold, preferably passivated, gold particles. Preferably, the gold particles are embedded in the form of micron-sized gold nanoclusters. The gold particles are preferably nanosized, more preferably from between approximately 1 and 100 nm, and still more preferably from between approximately 5 and 50 nm.

In an embodiment of the present invention, the nanoparticles are wrapped up by the polymer in a composite formation, and this new "composite" forms a more efficient diode when making a Schottky contact with a metal electrode such as a sufficiently low work-function metal. Such a low work-function metal can include, but is not limited to, Al. Nanoparticles enhance Schottky formation between an electronic and optoelectronic polymer composite (organic polymer and metal nanoparticles defined as the "composite") and the metal junction.

The steps for the formation of the nanocomposite of the present invention are preferably as follow. Initially, a colloid solution (e.g. gold colloid solution) is prepared. Preferably, aqueous tetrachloroaurate hydrate and aqueous sodium borohydride are mixed in an optimized ratio dependent on the starting materials used. The 1 mM aqueous tetrachloroaurate hydrate solution is preferably reduced by the slow addition of 7 mM aqueous sodium borohydride. Preferably, after the solution is reduced to Au°, indicated by the solution turning from yellow to a cherry color, toluene or other solvent is gently added insuring no immediate mixing and creating a biphasic mixture.

To initiate the interaction between the polymer and the gold hydrosol poly(m-phenylenevinylene-co-2,5-dioctoxy-p-phenlenevinylene), toluene is preferably added to the toluene layer and the solution is rapidly stirred for several minutes. The solution is then preferably left to settle, thus allowing the fine bluish/violet colored suspension of the Au/PmPV nanocomposite to transfer into the toluene layer. This top layer is then separated, preferably in a separating funnel and the composite filtered out under vacuum to yield a nanocomposite of gold in PmPV.

The preferred embodiment of the present invention comprises a unique wet chemical synthesis of a one-step method for the immobilization and self-organization of a nanocomposite such as a gold/PmPV whereby each gold nanoparticle is encapusulated by PmPV. The facile technique presented can be applied to the arrangement of different sizes and types of nanoparticles and to a number of applications such as photodiodes and large nonlinear optical response devices.

Other solvents and solutions may also be used depending on the nanoparticles and non-linear chains utilized.

The present invention comprises a unique "bottom-up" synthetic route for producing gold-PmPV passivated nanocomposite thin films which negates the need for pre-synthesising functionalized gold nanoparticles. The films contain uniformly dispersed discrete gold particles which have been tightly coated in PmPV and subsequently form clusters within the film.

INDUSTRIAL APPLICABILITY

The invention is further illustrated by the following non-limiting examples.

EXAMPLE 1

Formation of Nanocomposite

To form nanocomposites, gold nanoparticles were prepared by reducing aqueous tetrachloroaurate hydrate (1 mM, 250 mL) by slow addition of aqueous sodium borohydride (7 mM, 10.0 mL). A biphasic mixture was created by gently adding toluene (100 mL, HPLC grade) to the gold colloid solution, insuring no mixing. A 1 mL solution of poly(m-phenylenevinylene-co-2,5-dioctoxy-p-phenlenevinylene) (PmPV) (0.5 g/L in toluene, Aldrich) was added to the toluene layer and the biphasic mixture was stirred at 600 rpm for 5 minutes. After allowing the solution to settle into two layers, a fine bluish/violet suspension was formed at the interface in the toluene layer. This layer was separated off and the newly formed PmPV-gold nanocomposite was filtered out under vacuum to yield a nanocomposite of approximately 5% wt/wt gold to PmPV.

EXAMPLE 2

Characterization of the Nanocomposite

The individual cluster sizes were estimated using suspensions of the PmPV/gold nanoclusters in toluene in a quartz cell (1 cm path length), using a Perkin Elmer Lambda 20 UV-VIS spectrometer.

Raman spectra were obtained for drop cast pure PmPV and PmPV-gold nanocomposite, on silicon substrates, using a Renishaw InVia Raman spectrometer equipped with a Raman Leica RE02 microscope. A He/Ne and a diode laser were used for 633 nm and 785 nm excitation, respectively. Calibration was carried out using silicon at 520.5 nm.

A very thin film of the PmPV-Au nanocomposite was spun coat onto a glass cover slide using a Model WS-400A 6NPP/LITE spin coater. This thin film was then imaged using a Veeco Aurora-3 Near-field scanning optical microscope (NSOM) in transmission mode using a 632.8 nm He—Ne laser for the incident illumination. Thus, topographical as well as optical transmission images were obtained simultaneously.

Sandwich cells were prepared by thermally evaporating gold at a pressure of $5 \times 10^{-6}$ mm Hg onto glass slides. Pure PmPV and PmPV-gold nanocomposite were spun coated onto separate Au slides at 800 rpm for 2 minutes using a Model WS-400A 6NPP/LITE spincoater. Aluminum was then thermally evaporated onto each layer. Gold wires were attached for use as electrical contacts.

The electrical behaviors of the Al/PmPV/Au and Al/PmPV-gold nanocomposite/Au sandwich cells were measured by current-voltage characteristics. These were carried out in the dark with an automated data acquisition system employing a Keithley 6487 pico-ammeter/voltage source instrument.

EXAMPLE 3

UV-Visible Spectroscopy

Figure 3:
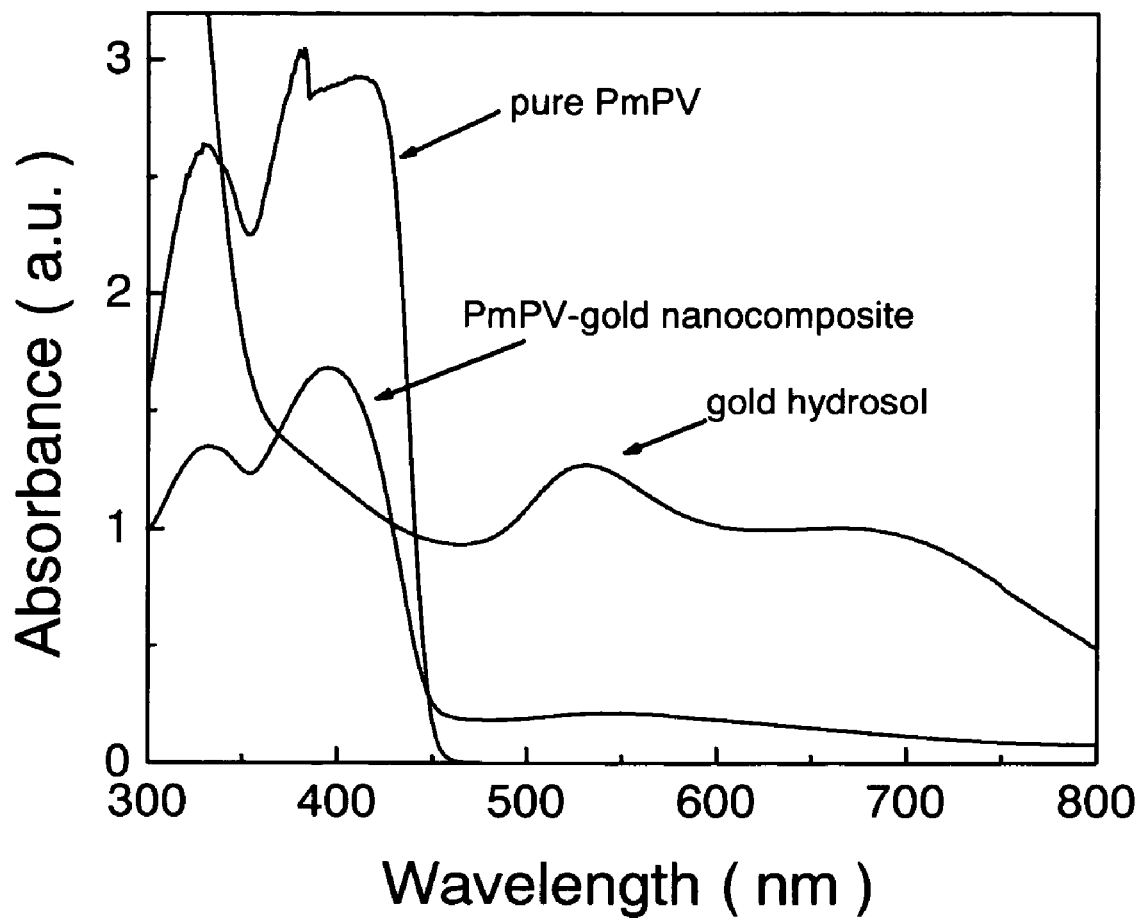
FIG. 3 shows UV-Visible spectra of (a) pure PmPV (0.5 g/L), (b) a PmPV-gold nanocomposite, and (c) gold hydrosol.

As shown in FIG. 3, distinct differences were observed in the 500-800 nm region between the gold colloid prior to, and then after, the addition of PmPV addition. As shown in the bottom spectrum in FIG. 3, the gold colloid prior to the addition of PmPV addition showed two surface plasmons located at 526 nm (2.36 eV) and 686 nm (1.81 eV). These two bands indicated a bimodal size distribution in the colloid, with the band at 526 nm corresponding to a particle size of approximately 20 nm and the band at 686 nm corresponding to particles in which inter-particular binding is occurring.

After addition of PmPV to the gold colloid biphasic mixture, the peak at 526 nm was broadened and red shifted by 0.11 eV, to 552 nm (2.25 eV). This drop in the gold nanoparticles Homo-Lumo gap is the result of an electron transfer process. Consequently, there was a shift to lower energy inflicted by the new charge transfer process, resulting in a decrease in the gold core electron density as 5 d electrons of the gold were transferred to the attached PmPV molecules carbon $\pi^*$ band. The larger particles (686 nm), which find it harder to overcome the gibbs free energy of the potential window of the biphasic interface, remained in the aqueous layer and were not assembled in the PmPV.

Likewise, differences were observed in the spectra between the 300-450 nm region of the pure PmPV and the PmPV-gold nanocomposite. Two absorption bands from the pure PmPV were observed in the visible region (300-500 nm) with peak maxima at 330 and 420 nm from the $\pi$–$\pi^*$ transition of the PmPV conjugated polymer backbone. The peak appearing at 380 nm was believed to be an artifact. After nanocomposite formation, the peak at 330 nm was reduced and the peak at 420 nm blue-shifted to approximately 400 nm. This shift was believed to be the result of strain induced in the helical PmPV backbone caused by the wrapping of the polymer around the gold nanoparticles.

EXAMPLE 4

Raman Spectroscopy

Figure 4:
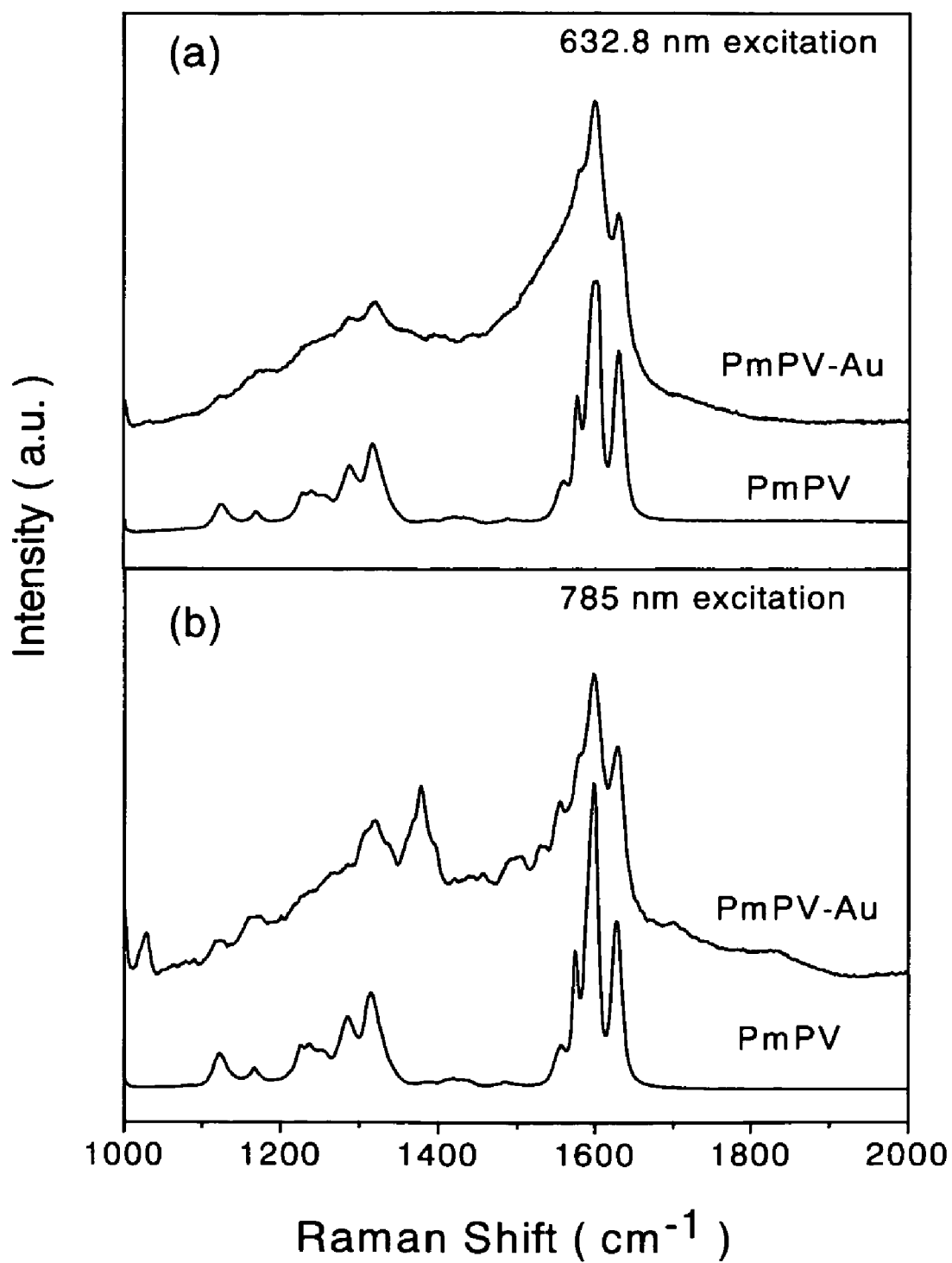
FIG. 4 shows normalized Raman spectra obtained using (a) 632.8 nm excitation Pure PmPV (bottom) and PmPV-gold nanocomposite (top), and (b) 785 nm excitation Pure PmPV (bottom) and PmPV-gold nanocomposite (top)

Normalized Raman spectra are shown in FIG. 4. No difference was observed for the spectra obtained for pure PmPV at different excitations (632.8 and 785 nm) as shown in FIG. 4, (a) and (b), respectively. In other words, there were no resonance effects.

As shown in FIG. 4(a), (632.8 nm excitation), after the addition of gold to the polymer, the three major peaks in the 1500-1700 cm$^{-1}$ region broadened (FIG. 4(a), top spectrum). This is a behavior seen from non-crystalline polymers where molecular vibrational frequencies spread out into bands that overlap. The three peaks of interest were at ~1577 cm$^{-1}$, corresponding to the C—C stretch of the phenyl ring, at ~1600 cm$^{-1}$, corresponding to the "quadrant stretch" vibrational mode of the di-substituted benzene ring component of the monomer, and the ~1629 cm$^{-1}$ mode corresponding to the C=C stretching mode of the vinyl group on the polymer backbone.

Relative ratios of the 1577 cm$^{-1}$ to 1600 cm$^{-1}$ peak increased upon addition of the gold nanoparticles to the PmPV. Enhancement of this signal suggested that the phenyl ring was interacting with the gold nanoparticle surface. Also observed was a decrease in the C═C vinyl group stretching mode, which was related to the decrease in vibrational freedom as the polymer wrapped around the particles. In addition, there was a reduction in the relative intensity of the peak at 1125 cm$^{-1}$, corresponding to C—C stretching modes of the dioctoxy side chains. The dampening of this vibration indicated restricted freedom of the dioctoxy side chains caused by interdigitation of the polymer passivated gold nanoparticles as they formed clusters similar to those observed in the NSOM images.

As shown in FIG. 4(b), at 785 nm excitation after addition of gold nanoparticles to the polymer, two new "in resonance" vibrational modes were observed. First, there appeared the vibration at 1378 cm$^{-1}$ from the symmetric deformation (umbrella mode) of the terminal CH$_3$ groups of the dioctoxy side chains. The appearance of this mode suggested restricted freedom of the dioctoxy side chains caused by interdigitation as it formed clusters. Second, there appeared a new mode at 1031 cm$^{-1}$ associated with monosubstituted benzene.

The Raman data suggested that the nanoparticles had been encapsulated in an amorphous layer tightly bound to the surface by the interaction of the phenyl rings and the gold, leaving the dioctoxy side arms free, or to interdigitate when close enough to other clusters.

EXAMPLE 5

Near-Field Scanning Optical Microscopy (NSOM)

Figure 5:
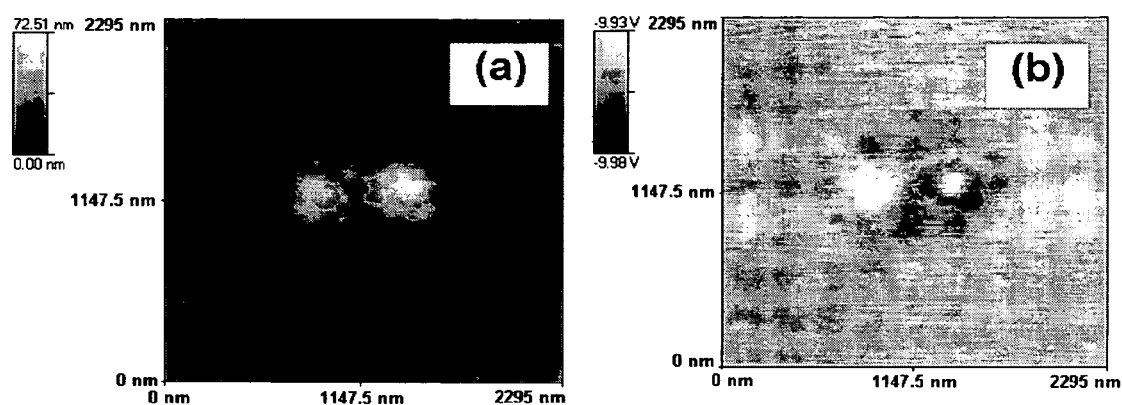
FIG. 5 shows a near-field scanning optical microscopy images of a PmPV-gold nanocomposite showing (a) topography, and (b) optical transmission intensity obtained using a scan rate of 1147 nm/second.

FIG. 5(a) shows a topographical image of two cluster aggregates of the PmPV-gold nanoclusters. Both cluster aggregates had an approximate size of 450-550 nm which were made of approximately 80-100 nm PmPV-gold nanoclusters. The UV-Visible results showed that the Au nanoparticles had an average size of 20 nm and the NSOM results indicated that these nanoparticles had been passivated by the PmPV polymer. Wrapping of this polymer has produced spherical nanoclusters. FIG. 5(b) shows the optical transmission image of these cluster aggregates. The image verifies that the overall lateral dimensions of the aggregates was not simply a tip artifact. Also, comparison between the topograpic and optical images shows that the aggregate on the left was rather embedded in the surrounding polymer matrix.

EXAMPLE 6

Electrical Characteristics

Figure 6:
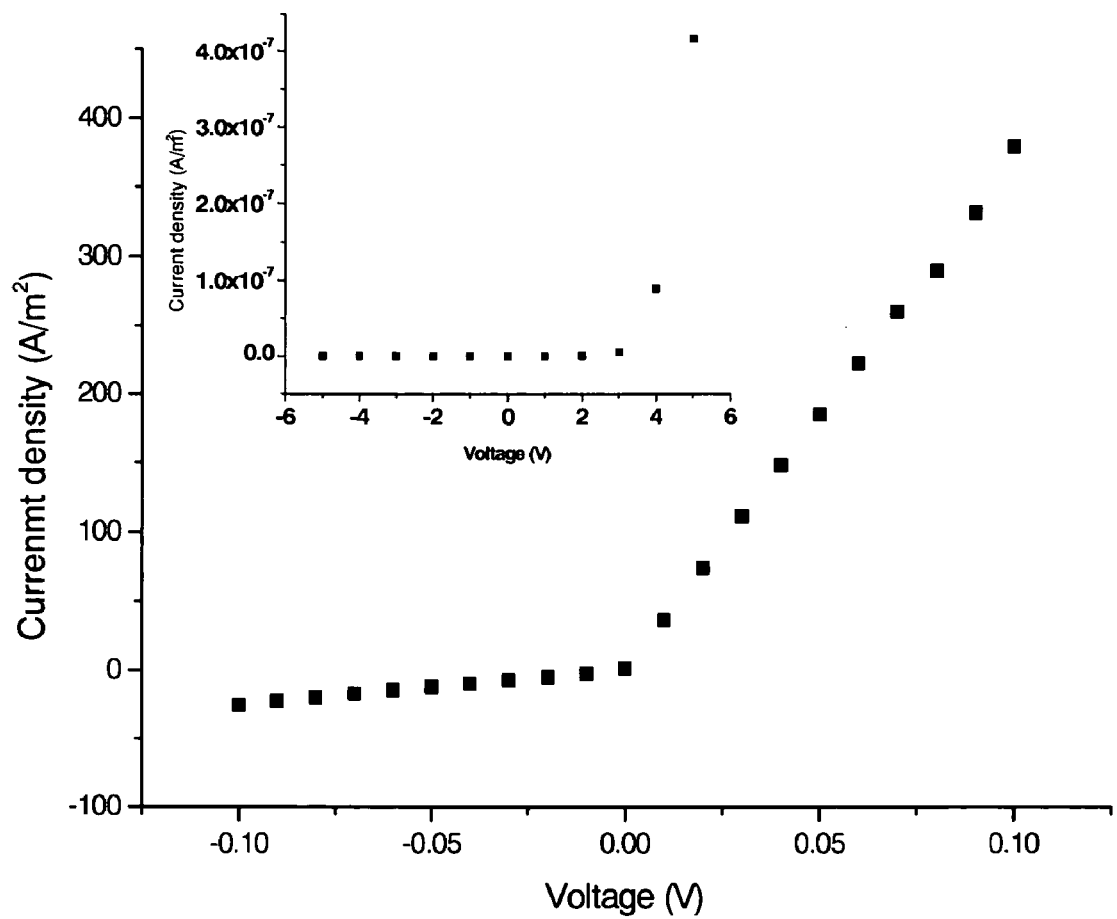
FIG. 6 shows a J-V plot of an Al/PmPV-Au composite/ Gold sandwich cell, the inset showing a J-V plot of an Al/PmPV/Gold cell.

FIG. 6 shows the current density versus voltage plot for the PmPV-gold nanocomposite sandwich cell, while the inset shows the plot for the pure PmPV sandwich cell. A different voltage scale was used for the two graphs because the same voltage on the Au-PmPV composite cell could not be applied on the pure PmPV cell. The same voltage could not be applied because the two devices entered into the space charge region at different voltages.

There was a large increase in electrical conductivity upon incorporation of gold nanoparticles into the polymer matrix. This indicated that the presence of the gold particles greatly reduced the depletion layer which in turn enhanced the tunneling of the charge carriers through the barrier. The sandwich cells showed the rectifying property. It is believed that the metals with high work function form an ohmic contact to the polymers and the low work function metals make a rectifying contact. Therefore, the rectifying property should be that of the junction of aluminum and the polymer. The cells behaved as Schottky diodes, with different ideality factors n, barrier heights $\phi_B$, and rectification ratios. These parameters are frequently used to describe the forward bias J-V relation.

Figure 7:
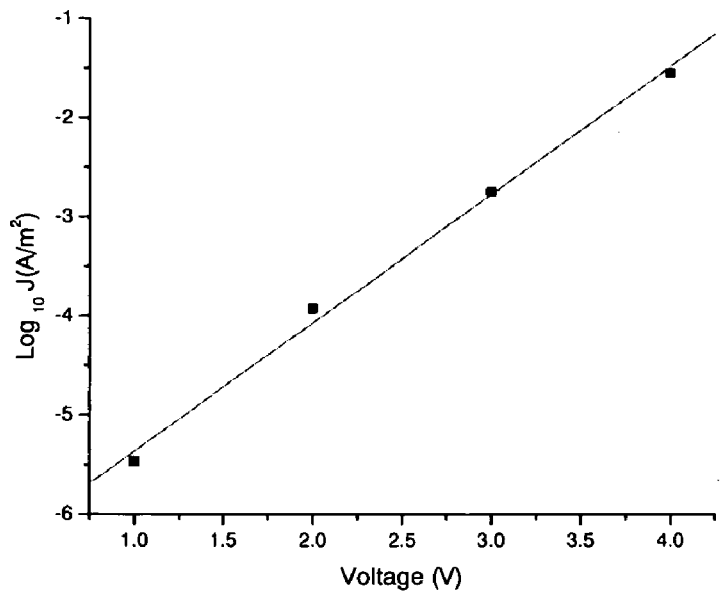
FIG. 7 shows a linear region of a semilog J-V plot of (a) PmPV and (b) PmPV-Au samples.
Figure 7:
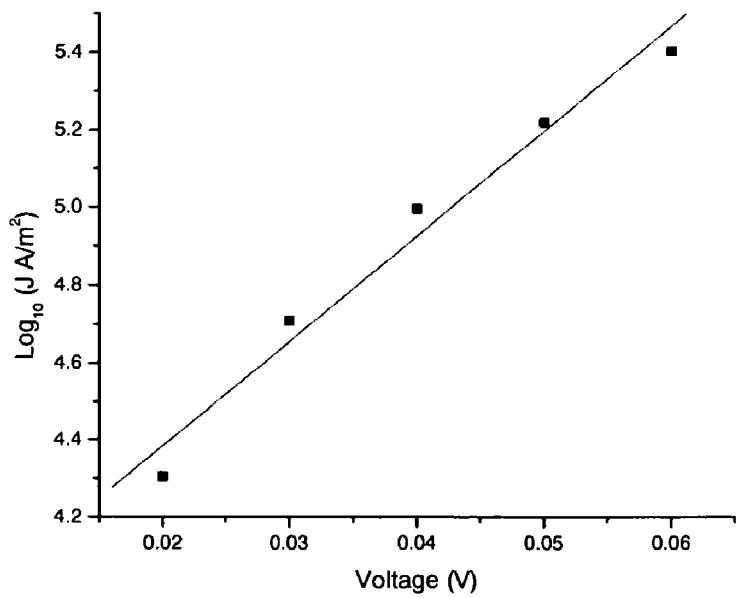

Analyzing the data on the basis of the thermionic emission theory (Equation: $J=J_o[\exp(qV/n\,kT)-1]$) and using the equations:

$$J_o = A**T^2[\exp(-q\phi_b/kT)]$$

and $$\frac{1}{n} = \frac{kT}{q}\frac{\partial \ln J}{\partial V}$$

the ideality factors were calculated to be 27.69 and 1.32 for PmPV and the PmPV-gold nanocomposite cells, respectively. These calculations were performed by extracting the slope from a linear fit to the semi-logarithmic plot of current density versus voltage as shown in FIG. 7. Testing of pure PmPV sandwich cells in air has shown poor ideality factors.

The barrier heights, calculated from the reverse saturation current, were 0.865 eV and 0.559 eV for PmPV and the PmPV-gold nanocomposite cells, respectively. The rectification ratio of the PmPV was $5.6 \times 10^3$ and that of the composite sample was 14.8.

The results indicated that the incorporation of nano-sized gold particles into the polymer matrix greatly enhanced the diode quality factor, allowing for better homogeneity of the barrier height over the interface (as compared to the pure PmPV cell) and reduced the rectification ratio by enhancing tunneling through the barrier. The low ideality values for these nanocomposite diodes suggested that the current flow was diffusion or surface/interface dominated.

Metallic nanoparticles near the interface may lower the barrier height or the depletion layer, thereby enhancing the charge transport across the interface. The 5% wt/wt gold to PmPV was used because that was the only weight percent region that worked well for enhancing the ideality factor. Lower concentrations were tried, but they did not yield any results significantly different from pure PmPV. Also, higher concentrations were not used to avoid creating an ohmic contact which would defeat the effect of the interface. In addition, creating a film with a good dispersion becomes increasingly difficult at higher concentrations.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above, and of the corresponding application(s), are hereby incorporated by reference.

What is claimed is:
1. A nanocomposite material comprising:
a non-linear chain; and nano-sized, high work function metal particles disposed in the form of clusters in said chain;
said metal particles comprising a noble metal; and
said metal particles enhancing band bending.

2. The nanocomposite material of claim 1 wherein said non-linear chain comprises a coiling chain.

3. The nanocomposite material of claim 2 wherein said coiling chain comprises a coiling polymer.

4. The nanocomposite material of claim 2 wherein said coiling chain comprises a coiling oligomer.

5. The nanocomposite material of claim 2 wherein said coiling chain comprises a coiling aggregate.

6. The nanocomposite material of claim 2 wherein said coiling chain comprises a coiling monomer.

7. The nanocomposite material of claim 3 wherein said coiling polymer comprises poly(m-phenylenevinylene-co-2,5-dioctoxy-p-phenylenevinylene).

8. The nanocomposite material of claim 1 wherein said non-linear chain comprises a biological system.

9. The nanocomposite material of claim 8 wherein said biological system comprises DNA.

10. The nanocomposite material of claim 1 wherein said metal particles comprise gold.

11. The nanocomposite material of claim 1 wherein said metal particles comprise silver.

12. The nanocomposite material of claim 1 wherein said nano-sized particles are from between approximately 1 and 100 nm in size.

13. The nanocomposite material of claim 12 wherein said nano-sized particles are from between approximately 5 and 50 nm in size.

14. A method for constructing a nanocomposite material comprising the steps of:
providing a non-linear chain; and
disposing, in the form of clusters, nano-sized, high work function metal particles in the polymer chain;
the metal particles enhancing band bending; and
the metal particles comprising a noble metal.

15. The method of claim 14 wherein the step of providing the non-linear chain comprises providing a coiling chain.

16. The method of claim 15 wherein the step of providing the coiling chain comprises providing a coiling polymer.

17. The method of claim 15 wherein the step of providing the coiling chain comprises providing a coiling oligomer.

18. The method of claim 15 wherein the step of providing the coiling chain comprises providing a coiling aggregate.

19. The method of claim 15 wherein the step of providing the chain comprises providing a coiling monomer.

20. The method of claim 14 wherein said non-linear chain comprises at least one material selected from the group consisting of a polymer, oligomer, monomer, aggregate, biological system, and a combination thereof.

21. The method of claim 16 wherein the step of providing the coiling polymer comprises providing poly(m-phenylenevinylene-co-2,5-dioctoxy-p-phenylene).

22. The method of claim 14 wherein the step of providing the non-linear chain comprises providing a biological system.

23. The method of claim 22 wherein the step of providing the non-linear chain comprises providing DNA.

24. The method of claim 14 further comprising the step of providing an interdigitation of the nano-sized particles through the non-linear chain.

25. The method of claim 14 further comprising the step of uniformly dispersing the nano-sized particles in the non-linear chain.

26. The method of claim 14 wherein the step of providing the nanocomposite material comprises providing a suspension comprising an organic material selectively coiled about metal nanoparticles.

27. A contact apparatus with enhanced electrical conductivity comprising:
a nanocomposite material comprising:
a non-linear chain; and
nano-sized, high work function metal particles disposed in the form of clusters in said chain; and
a metal electrode;
said metal parcicles comprising a noble metal; and
said metal particles enhancing band bending at a Shottky contact juncture of said nanocomposite material and said metal electrode.

28. The apparatus of claim 27 wherein said metal electrode comprises a metal having a work function lower than that of said nano-sized, high work function metal particles.

29. The apparatus of claim 27 wherein said metal electrode comprises aluminum.

30. The apparatus of claim 27 wherein said metal particles comprise gold.

31. The nanocomposite material of claim 1 wherein said metal particles comprise platinum.

32. The nanocomposite material of claim 1 wherein said metal particles comprise palladium.

33. The method of claim 14 wherein the metal particles comprise gold.

34. The method of claim 15 wherein the metal particles comprise silver.

35. The method of claim 14 wherein the metal particles comprise platinum.

36. The method of claim 14 wherein the metal particles comprise palladium.

37. The apparatus of claim 27 wherein said metal particles comprise silver.

38. The apparatus of claim 27 wherein said metal particles comprise platinum.

39. The apparatus of claim 27 wherein said metal particles comprise palladium.

* * * * *